United States Patent
Reme

(10) Patent No.: US 7,505,465 B2
(45) Date of Patent: Mar. 17, 2009

(54) PACKET TRANSMISSION METHOD WITH PACKET RETRANSMISSION REQUESTS AND A CONTROL MECHANISM RELATING TO THE TRANSMISSION OF SUCH REQUESTS

(75) Inventor: Jean-Marc Reme, Montigny le Bretonneux (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1219 days.

(21) Appl. No.: 10/180,573

(22) Filed: Jun. 26, 2002

(65) Prior Publication Data

US 2003/0002501 A1    Jan. 2, 2003

(30) Foreign Application Priority Data

Jun. 26, 2001  (FR) .................... 01 08420

(51) Int. Cl.
*H04L 12/28* (2006.01)
*H04L 12/56* (2006.01)

(52) U.S. Cl. ............... 370/394; 370/389; 370/352; 370/401; 370/353; 370/356; 370/468; 370/473; 709/247; 709/246; 709/229; 714/2; 714/776; 714/758; 714/748; 714/794

(58) Field of Classification Search ............ 714/15, 714/25, 30, 21, 49, 50, 51, 724, 726, 733, 714/734, 108, 811
See application file for complete search history.

(56) References Cited

U.S. PATENT DOCUMENTS

| 5,768,527 | A | 6/1998 | Zhu et al. ............... 395/200.61 |
|---|---|---|---|
| 6,233,283 | B1 * | 5/2001 | Chiu et al. ............. 375/240.27 |
| 6,317,462 | B1 * | 11/2001 | Boyce ................... 375/240.27 |
| 6,445,717 | B1 * | 9/2002 | Gibson et al. ................ 370/473 |
| 6,490,705 | B1 * | 12/2002 | Boyce ........................ 714/776 |
| 6,574,218 | B1 * | 6/2003 | Cooklev ..................... 370/352 |
| 6,792,470 | B2 * | 9/2004 | Hakenberg et al. .......... 709/232 |
| 6,918,077 | B2 * | 7/2005 | Fukushima et al. ......... 714/748 |
| 7,114,002 | B1 * | 9/2006 | Okumura et al. ............ 709/232 |
| 2003/0118107 | A1 * | 6/2003 | Itakura et al. .......... 375/240.19 |
| 2003/0206559 | A1 * | 11/2003 | Trachewsky et al. ........ 370/509 |
| 2005/0022098 | A1 * | 1/2005 | Vayanos et al. ............. 714/776 |

* cited by examiner

*Primary Examiner*—Cynthia Britt
*Assistant Examiner*—Guerrier Merant

(57) ABSTRACT

In a packet transmission system, an importance level is assigned by a transmitter to transmitted packets. The transmitted packets contain one or more importance levels of those packets transmitted previously, so that a receiver can recover the importance level associated with a lost packet from a received packet. The receiver decides whether to send a retransmission request relating to the lost packet based on the importance level of the lost packet.

11 Claims, 1 Drawing Sheet

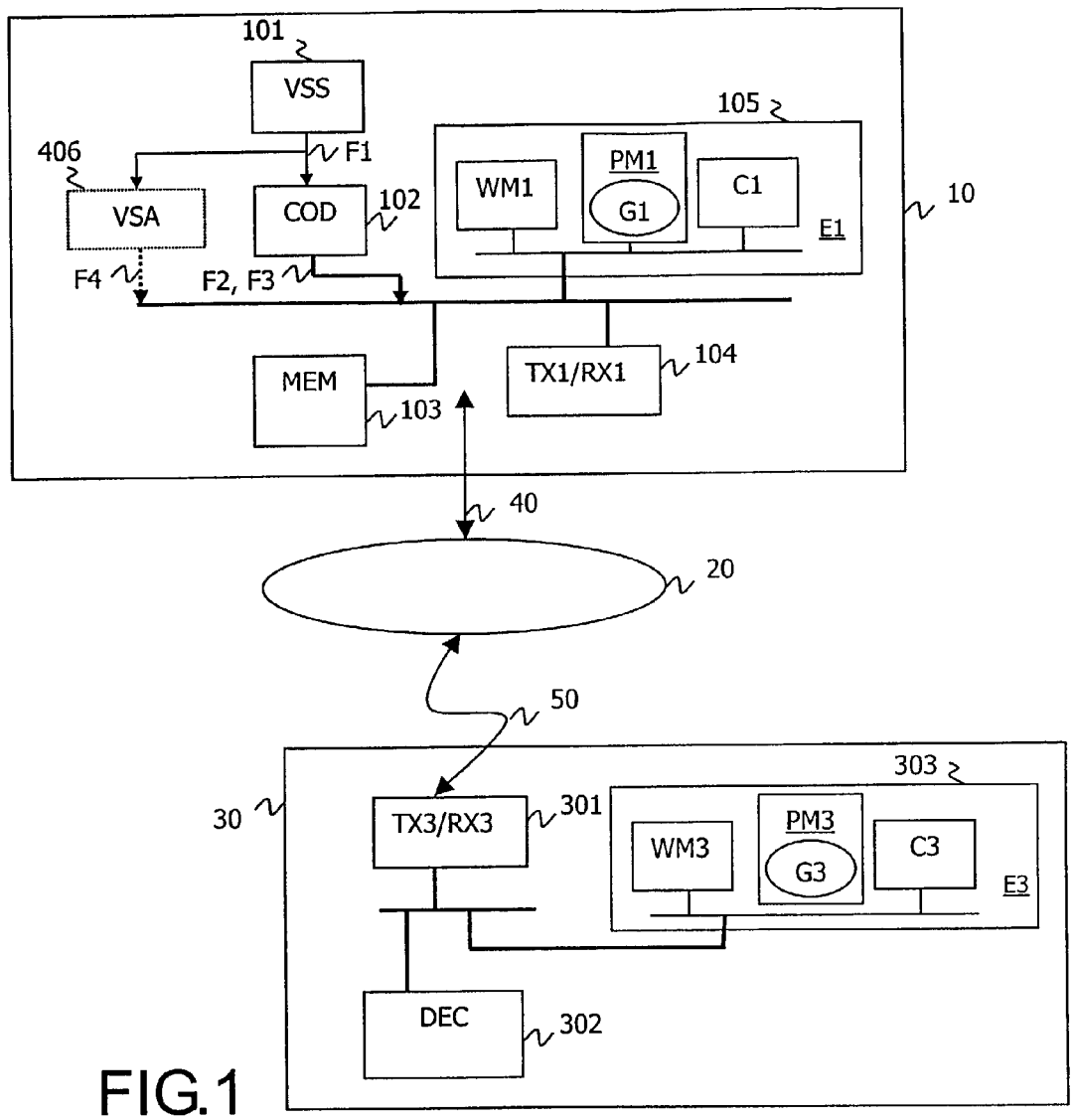
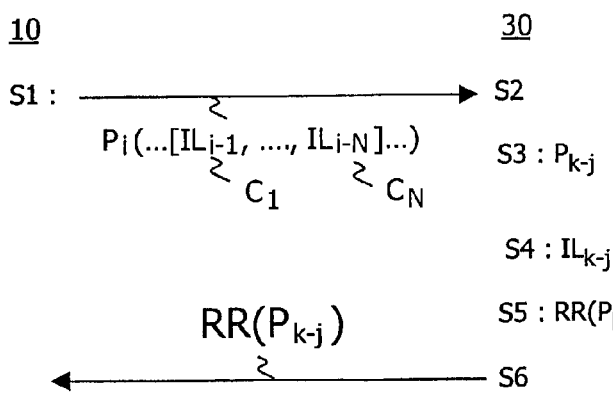
FIG.1
FIG.2

PACKET TRANSMISSION METHOD WITH PACKET RETRANSMISSION REQUESTS AND A CONTROL MECHANISM RELATING TO THE TRANSMISSION OF SUCH REQUESTS

FIELD OF THE INVENTION

The invention relates to a transmission system comprising at least a transmitter and a receiver, said transmitter comprising means of transmitting packets, said receiver comprising means of receiving packets, means of detecting lost packets, and means of deciding whether to transmit a retransmission request relating to a lost packet as a function of an importance level associated with said lost packet.

The invention also relates to a server comprising means of transmitting packets, and a terminal comprising means of receiving packets, means of detecting lost packets, and means of deciding whether to transmit a retransmission request relating to a lost packet as a function of an importance level associated with said lost packet.

The invention also relates to a packet transmission method comprising a step for transmitting packets from a transmitter to a receiver and, at said receiver, a step for detecting lost packets, and a step for deciding whether to transmit a retransmission request relating to a lost packet as a function of an importance level associated with said lost packet.

The invention also relates to a program comprising program code instructions for employing a method of this kind when it is executed by a processor.

The application applies in a general manner to any transmission by means of packets across an unreliable network. It applies in particular to the transmission of video data via the Internet to mobile radio communication terminals.

BACKGROUND ART TO THE INVENTION

The article "An efficient multimedia distribution framework for Internet video" by Jia Yao, Jozsef Vass, Yan Huang and Xinhua Zhuang, published in the journal Image and Video Communications and Processing 2000—Proceedings of SPIE Vol. 3974, describes a transmission system in which the receiver decides whether or not to transmit a retransmission request relating to a lost packet while taking account in particular of the importance of said lost packet.

This article does not define the idea of the importance of a packet, and does not describe the manner in which the receiver determines the importance of a lost packet.

A first object of the invention is to present a mechanism allowing the receiver to determine an importance level associated with a lost packet.

A second object of the invention is to present several ways of defining the importance level of a packet.

SUMMARY OF THE INVENTION

A transmission system according to the invention and as defined in the introductory paragraph is characterized in that said importance level is assigned by said transmitter, the transmitted packets contain one or more importance levels relating to one or more other packets, and said receiver comprises means of recovering the importance level relating to a lost packet from a received packet.

By way of advantage, said importance level is coded in several bits.

When at least some packets contain data relating to an image in a video sequence, said transmitter advantageously comprises a video sequence analyser allowing the images in a video sequence to be classified in an image category which is one of several possible categories, and the importance level assigned to a packet depends on the category of the image to which the data contained in said packet belongs.

When at least some packets contain data coded in accordance with a coding method chosen from among several possible coding methods, the importance level assigned to a packet depends by way of advantage on the coding method utilized in order to code the data contained in said packet.

By way of advantage, the transmitter and the receiver having at their disposal a certain bandwidth of a transmission network for communication between themselves, said receiver comprises means of determining an importance level on the basis of which a retransmission request is transmitted while taking account of the utilization of said bandwidth.

This embodiment allows the retransmission strategy to be adapted to the load conditions of the transmission network at a given time. For example, the importance level required for a retransmission request to be transmitted is all the lower when the percentage of the bandwidth dedicated to retransmissions is low.

BRIEF DESCRIPTION OF THE DRAWINGS

These and other aspects of the invention are apparent from and will be elucidated, by way of non-limiting example, with reference to the embodiment(s) described hereinafter.

In the drawings:

FIG. 1 is a diagram of an example of a transmission system according to the invention, FIG. 2 is a diagram describing the steps in an embodiment of a transmission method according to the invention.

DESCRIPTION OF A PREFERRED EMBODIMENT OF THE INVENTION

The invention relates to a packet transmission method between a transmitter and a receiver. The transmitter transmits packets to the receiver which contain useful data and which are referred to as data packets in the following of this description. The receiver detects lost data packets and transmits retransmission requests to the transmitter relating to at least some lost packets. An example of a system of this kind will be described in the following, in which said useful data is data coded in the MPEG-4 format. This example is not limitative. The invention applies to any type of data.

FIG. 1 shows an example of a transmission system according to the invention comprising a server 10 which performs the function of transmitter in terms of the invention, a transmission network 20, and a terminal 30 which performs the function of receiver in terms of the invention.

The transmission network 20 is in the form, for example, of a cellular network, such as a GPRS network or a UMTS network. The server 10 is connected to the transmission network 20 by means of a link 40 accessing a packet-type network like the Internet. The terminal 30 is connected to the cellular network by means of a radio link 50.

The server 10 comprises a video sequence source VSS represented by a block 101, a coder COD of the MPEG-4 type represented by a block 102, a data memory MEM represented by a block 103, a transmission/reception device TX1/RX1 represented by a block 104, and a microprocessor assembly E1 represented by a block 105 and comprising a working memory WM1, a program memory PM1 and a processor C1.

The coder COD receives as its input video sequences F1 supplied by the video sequence source VSS. It supplies coded data F2 as its output. The coded data F2 is placed in packets at the microprocessor assembly E1. The packets formed in this way are transmitted to the transmission/reception device TX1/RX1 from where they are transmitted over the transmission network 20 via the link 40. In some cases, the lost packets must be retransmitted when they are lost. In order to allow retransmission of this kind, at least part of the contents of the transmitted packets is stored in the data memory MEM.

The terminal 30 comprises a transmission/reception device TX3/RX3 represented by a block 301, a decoder DEC of the MPEG-4 type represented by a block 302, and a microprocessor assembly E3 represented by a block 303 which comprises a working memory WM3, a program memory PM3 and a processor C3.

The program memories PM1 and PM3 contain a program or a group of programs G1 and G3 respectively, containing program code instructions for employing a transmission method according to the invention such as will be described with regard to FIG. 2.

Transmission between the server 10 and the terminal 30 is effected by way of advantage by utilizing a transport protocol of the RTP type. The RTP transport protocol is described in the document RFC 1889 published by the IETF. In particular:

The useful data is transmitted from the server 10 to the terminal 30 in data packets of the type described in paragraph 5 of RFC 1889.

These data packets contain in particular a field entitled "Sequence Number". The sequence number SN contained in this field is incremented by one unit each time a data packet is transmitted. It is intended to be utilized by the receiver in order to detect the loss of one or more data packets in a sequence of data packets. For example, if the receiver receives a packet with the sequence number 36, followed by another packet with the sequence number 40, it deduces from this that the packets that contained the sequence numbers 37, 38 and 39 have been lost. The SN field of a packet must be stored in the memory MEM in order to allow retransmission of that packet.

These data packets also contain a "Payload" field which contains the useful data, which is to say, in the example described here, data coded in the MPEG-4 format. The "Payload" field of a packet must be stored in the memory MEM in order to allow retransmission of that packet.

The retransmission requests are transmitted from the terminal 30 to the server 10 in control packets of the type described in paragraph 6 of RFC 1889.

In accordance with the invention, the microprocessor assembly E1 assigns an importance level to each packet transmitted by the transmitter. And it constructs the transmitted packets in such a way that they comprise one or more fields intended to contain the importance level associated with one or more other packets. For example, each transmitted packet $P_1$ contains N importance levels relating to N previous packets in the order of transmission $P_{1-1}, \ldots, P_{1-N}$. The number N of importance levels contained in a packet is determined as a function of the number of consecutive packets likely to be lost so that when a packet is lost, the receiver can recover its importance level from the first packet received correctly after the lost packet.

In a first embodiment, the importance level of a packet is a function of the coding method utilized in order to code the useful data transmitted in that packet. The MPEG-4 standard envisages three coding methods:

the coding method I (from the English "Intra Coding") in which an image is only coded from data which it contains itself;

the coding method P (from the English "Predictive Coding") in which an image is coded by utilizing a reference image which precedes it in time;

the coding method B (from the English "Bidirectional Predictive Coding") in which an image is coded from a reference image which precedes it in time and a reference image which follows it in time.

Images coded by utilizing the coding method I are particularly important since their loss prevents the reconstitution of images for which they have served as a reference image during coding. By way of advantage, the server 10 therefore assigns a greater importance to images coded in accordance with the coding method I than images coded in accordance with the coding method P. Similarly, it assigns a greater importance to images coded in accordance with the coding method P than images coded in accordance with the coding method B. To this end, the coder COD supplies, in addition to the coded data F2, a data item F3 relating to the coding method of said coded data.

In a second embodiment, the server 10 comprises a video sequence analyser VSA (shown in FIG. 1 by a block with dotted outline bearing the reference 406). This video sequence analyser classifies the images in a video sequence in an image category which is one of several possible categories. It transmits a data item F4 to the microprocessor assembly E1 relating to the image category to which the coded data F2 transmitted by the coder COD belongs. For example, in a video sequence relating to a football match, the image categories may be the goals, the game, the spectators, etc. Techniques for analysing video sequences are well known. In this respect, reference will be made, for example, to the article "Analysis of Video Sequences: Table of contents and index creation" by Joan Llach and Philippe Salembier published in the "Proceedings of the International Workshop on Very Low Bitrate Video Coding", VLBV '99 pages 52-56, Kyoto, Japan, October 1999. The data item F4 is utilized by the microprocessor assembly E1 in order to assign an importance level to each packet. Using the example of the football match again, the images classified in the category "goal" have a higher importance level than the images classified in the category "game", the latter having a higher importance level than the images classified in the category "spectator".

In a third embodiment of the invention, in order to assign an importance level to the packets to be transmitted, the microprocessor assembly E1 takes account simultaneously of the data item F3 relating to the coding method of the image and the data item F4 relating to the image category.

At the receiver 30, one or more fixed and/or variable retransmission strategies are defined and employed by the microprocessor assembly E3.

For example, a fixed retransmission strategy may comprise authorising a certain number of retransmission requests as a function of the importance level of the packet. Using the previous examples again, in which three importance levels were defined, the following retransmission strategy can be defined, for example:

no retransmission request if the importance level is equal to 1, one retransmission request if the importance level is equal to 2, the number of retransmission requests is unlimited if the importance level is equal to 3.

A variable retransmission strategy may comprise, for example, taking account of the manner in which the available bandwidth is utilized when the retransmission request will be transmitted. For example, the lower the percentage of bandwidth utilized for retransmissions, the lower will be the importance level required for sending a retransmission request. The following strategy can be defined for example:

if 1% of the bandwidth or more is utilized for retransmissions, the importance level required for a retransmission request to be transmitted is equal to 3;

if 0.5% to 1% of the bandwidth is utilized for retransmission, the importance level required for a retransmission request to be transmitted is equal to or greater than 2;

if less than 0.5% of the bandwidth is utilized for retransmission, the importance level required for a retransmission request to be transmitted is equal to or greater than 1.

FIG. 2 shows an example of a packet transmission method according to the invention. As shown in FIG. 2, a method of this kind comprises:

A step S1 for transmitting packets $P_1$ from the transmitter 10 to the receiver 30. Each packet $P_1$ comprises N fields $C_i, \ldots, C_N$ which contain the N importance levels $IL_1, \ldots, IL_N$ relating to N previous packets in the order of transmission $P_{1-1}, \ldots, P_{1-N}$.

A step S2 for receiving the packets $P_1$.

A step S3 for detecting lost packets $P_{k-j}$ by observation of the sequence numbers contained in the received packets.

A step S4 for recovering the importance level $IL_{k-j}$ of a lost packet $P_{k-j}$, in the field $C_{k-j}$ of the first packet $P_k$ received correctly after the lost packet $P_{k-j}$.

A step S5 for deciding whether to transmit a retransmission request RR relating to the lost packet $P_{k-j}$ as a function of the importance level $IL_{k-j}$ recovered in this way.

A step for transmitting a retransmission request $RR(P_{k-j})$ relating to the lost packet when said decision is positive.

The invention is not limited to the embodiments described above by way of example. In particular, other criteria can be applied, in addition to those described here, in order to limit the number of retransmission requests transmitted over the network. In addition, mechanisms for limiting retransmissions can also be put in place at the transmitter in order to limit the number of retransmissions that actually take place.

The invention claimed is:

1. A transmission system, comprising:
a transmitter for transmitting packets;
and a receiver for receiving the packets, detecting a lost packet, and deciding whether to transmit a retransmission request relating to the lost packet as a function of an importance level associated with said lost packet, wherein an importance level is assigned by said transmitter, and a packet containing N data items indicating an importance level relating to N previous packets where N is an integer greater than 1 and is determined as a function of a number of consecutive packets likely to be lost, said receiver recovering the importance level relating to the lost packet from a received packet.

2. The transmission system as claimed in claim 1, wherein at least some packets contain data relating to an image in a video sequence, said transmitter comprising a video sequence analyser for classifying images in the video sequence into an image category which is one of several categories, and wherein the importance level assigned to a packet depends on the image category to which the data contained in said packet belongs.

3. The transmission system as claimed in claim 1, wherein at least some packets contain data coded in accordance with a coding method chosen from among several coding methods, and the importance level assigned to a packet depends on the coding method utilized to code the data contained in said packet.

4. The transmission system as claimed in claim 1, wherein the transmitter and the receiver utilize a bandwidth of a transmission network for communication, said receiver deciding whether to transmit a retransmission request as a function of an importance level associated with said lost packet and utilisation of said bandwidth.

5. A server, comprising:
a transmitter for transmitting packets and assigning an importance level to said packets, a packet containing N data items indicating an importance level relating to N previous packets where N is an integer greater than 1 and is determined as a function of a number of consecutive packets likely to be lost, the importance level being recovered by a receiver from a received packet if the packet is lost at said receiver in order to decide whether to transmit a retransmission request relating to said lost packet.

6. The server as claimed in claim 5, wherein at least some packets contain data relating to an image in a video sequence, said server comprising a video sequence analyser for classifying the images in the video sequence into an image category which is one of several categories, and wherein the importance level assigned to a packet depends on the image category to which the data contained in said packet belongs.

7. The server as claimed in claim 5, wherein at least some packets contain data coded in accordance with a coding method chosen from among several coding methods, and the importance level assigned to a packet depends on the coding method utilized to code the data contained in said packet.

8. A terminal, comprising:
a receiver for receiving packets, detecting a lost packet, and deciding whether to transmit a retransmission request relating to the lost packet as a function of an importance level associated with said lost packet, said packets containing N data items indicating an importance level relating to N previous packets where N is an integer greater than 1 and is determined as a function of a number of consecutive packets likely to be lost, said terminal recovering the importance level relating to a lost packet from a received packet.

9. The terminal as claimed in claim 8, wherein the terminal utilizes a bandwidth of a transmission network for transmitting and receiving said packets, the terminal deciding whether to transmit a retransmission request as a function of an importance level associated with said lost packet and the utilisation of said bandwidth.

10. A packet transmission method, comprising:
transmitting packets;
detecting a lost packet;
deciding whether to transmit a retransmission request relating to the lost packet as a function of an importance level associated with said lost packet, wherein an importance level is assigned at a transmitter, N data items indicating an importance level relating to N previous packets is transmitted in said packets, and the importance level relating to the lost packet is recovered from a received packet, and wherein N is an integer greater than 1 and is determined as a function of a number of consecutive packets likely to be lost.

11. A program, embedded in a computer readable medium, having instructions for performing actions comprising:
transmitting packets;
detecting a lost packet;
and deciding whether to transmit a retransmission request relating to the lost packet as a function of an importance level associated with the lost packet, wherein an importance level is assigned at a transmitter, N data items indicating an importance level relating to N previous packets is transmitted in the packets, and the importance level relating to the lost packet is recovered from a received packet, and wherein N is an integer greater than 1 and is determined as a function of a number of consecutive packets likely to be lost.

* * * * *